(12) United States Patent
Tourapis et al.

(10) Patent No.: US 8,135,234 B2
(45) Date of Patent: Mar. 13, 2012

(54) METHOD AND APPARATUS FOR EDGE-BASED SPATIO-TEMPORAL FILTERING

(75) Inventors: Alexandros Tourapis, Burbank, CA (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 907 days.

(21) Appl. No.: 12/223,051

(22) PCT Filed: Jan. 30, 2007

(86) PCT No.: PCT/US2007/002578
§ 371 (c)(1),
(2), (4) Date: Jul. 18, 2008

(87) PCT Pub. No.: WO2007/089803
PCT Pub. Date: Aug. 9, 2007

(65) Prior Publication Data
US 2010/0220939 A1 Sep. 2, 2010

Related U.S. Application Data

(60) Provisional application No. 60/764,252, filed on Jan. 31, 2006.

(51) Int. Cl.
*G06K 9/40* (2006.01)
(52) U.S. Cl. ........ 382/275; 382/232; 382/254; 382/260; 382/294; 382/299; 341/94; 375/240.01; 375/240.12; 375/240.25; 375/240.26
(58) Field of Classification Search .................. None
See application file for complete search history.

(56) References Cited

U.S. PATENT DOCUMENTS
6,340,994 B1  1/2002 Margulis et al.
(Continued)

FOREIGN PATENT DOCUMENTS
WO  WO02063562  8/2002
(Continued)

OTHER PUBLICATIONS

Segall, C. A. et al.: "High-Resolution Images from Low-Resolution Compressed Video," IEEE Signal Processing Magazine, May 2003, pp. 37-48.

(Continued)

*Primary Examiner* — Sath V Perungavoor
*Assistant Examiner* — Jason Heidemann
(74) *Attorney, Agent, or Firm* — Robert D. Shedd; Paul P. Kiel; Guy H. Eriksen

(57) ABSTRACT

There are provided methods and apparatus for edge-based spatio-temporal filtering. An apparatus for filtering a sequence of pictures includes a spatial filter, a motion compensator, a deblocking filter, and a temporal filter. The spatial filter is for spatially filtering a picture in the sequence and at least one reference picture selected from among previous pictures and subsequent pictures in the sequence with respect to the picture. The motion compensator, in signal communication with the spatial filter, is for forming, subsequent to spatial filtering, multiple temporal predictions for the picture from the at least one reference picture. The deblocking filter, in signal communication with the motion compensator, is for deblock filtering the multiple temporal predictions. The temporal filter, in signal communication with the deblocking filter, is for temporally filtering the multiple temporal predictions and combining the multiple temporal predictions to generate a noise reduced version of the picture.

26 Claims, 2 Drawing Sheets

U.S. PATENT DOCUMENTS

| | | | |
|---|---|---|---|
| 6,442,203 B1* | 8/2002 | Demos | 375/240.16 |
| 7,119,837 B2* | 10/2006 | Soupliotis et al. | 348/208.99 |
| 7,386,049 B2* | 6/2008 | Garrido et al. | 375/240.15 |
| 2002/0118399 A1* | 8/2002 | Estevez et al. | 358/426.07 |
| 2004/0017852 A1 | 1/2004 | Garrido et al. | |
| 2005/0122426 A1 | 6/2005 | Winger et al. | |
| 2005/0134602 A1 | 6/2005 | Winger et al. | |
| 2005/0134730 A1 | 6/2005 | Winger et al. | |
| 2005/0163402 A1 | 7/2005 | Aiso | |
| 2006/0153301 A1* | 7/2006 | Guleryuz | 375/240.16 |
| 2006/0291557 A1* | 12/2006 | Tourapis | 375/240.12 |
| 2007/0064815 A1* | 3/2007 | Alvarez et al. | 375/240.29 |
| 2007/0171987 A1* | 7/2007 | Trimeche | 375/240.27 |

FOREIGN PATENT DOCUMENTS

WO  WO2006006796  1/2006

OTHER PUBLICATIONS

Altunbasak, Y. et al.: "Super-Resolution Still and Video Reconstruction From MPEG-Coded Video," IEEE Transactions on Circuits and Systems for Video Technology, vol. 12, No. 4, Apr. 2002, pp. 217-226.

Alvarez, L. et al.: "High Resolution Images from a Sequence of Low Resolution Observations," Partially supported by the "Comision Nacional de Ciencia y Tecnologia," under contract TIC2000-1275 and the Motorola Center for Communications, Northwestern Univeristy, Illinois, pp. 1-31, 2004.

Borman, S. et al.: "Spatial Resolution Enhancement of Low-Resolution Image Sequences a Comprehensive Review with Directions for Future Research," Laboratory for Image and Signal Analysis (LISA), University of Notre Dame, Notre Dame, IN 46556, Jul. 8, 1998, pp. i-x and 1-53.

Chao, T-T at al.: "Motion-Compensated Spatio-Temporal Interpolation for Frame Rate Up-Conversion of Interlaced or Progressive Image Sequence," SPIE, vol. 2308, 1994, XP001053678, pp. 682-693.

Cheong, H-Y et al.: "Adaptive Spatio-Temporal Filtering for Video De-Noising," IEEE International Conference on Image Processing (ICIP), 2004, pp. 965-968.

Dubois, E. et al.: "Noise Reduction in Image Sequences Using Motion-Compensated Temporal Filtering," IEEE Transactions on Communications, vol. Com.-32, No. 7, Jul. 1984, XP001024707, pp. 826-831.

Elad, M. et al.: "Super-Resolution Reconstruction of Image Sequences," IEEE Transactions on Pattern Analysis and Machine Intelligence, vol. 21, No. 9, Sep. 1999, XP000851866, pp. 817-834.

Llach, J. et al.: "H.264 encoder with low complexity noise pre-filtering," Proceedings of SPIE, Bellingham, WA, vol. 5203, Applications of Digital Image Processing, XXVI, 2003, XP002292439, pp. 478-489.

Park, S. et al.: "Spatially Adaptive High-Resolution Image Reconstruction of DCT-Based Compression Images," IEEE Transactions on Image Processing, vol. 13, No. 4, Apr. 2004, pp. 573-585.

Segall, C. A. et al.: "High Resolution Images from a Sequence of Low Resolution and Compressed Observations: A Review," Partially supported by the "Comision Nacional de Ciencia y Tecnologia," under contract TIC2000-1275, pp. 1-28, May 2003.

Search Report Dated August 7, 2007.

* cited by examiner

METHOD AND APPARATUS FOR EDGE-BASED SPATIO-TEMPORAL FILTERING

CROSS-REFERENCE TO RELATED APPLICATIONS

This application claims the benefit, under 35 U.S.C. §365 of International Application PCT/US2007/002578, filed Jan. 30, 2006 which was published in accordance with PCT Article 21(2) on Aug. 9, 2007 in English and which claims the benefit of U.S. provisional patent application No. 60/764,252 filed Jan. 31, 2007.

FIELD OF THE INVENTION

The present invention relates generally to video encoding and decoding and, more particularly, to methods and apparatus for edge-based spatio-temporal filtering.

BACKGROUND OF THE INVENTION

The generation of super-resolution images from a sequence of low-resolution images has recently received great interest, and has led to the emergence of several compelling algorithms. Nevertheless, most of the existing algorithms rely on relatively complex and difficult to implement models. Moreover, many of the existing algorithms do not always achieve satisfactory results.

Physical constraints of imaging sensors can significantly limit the image resolution and subsequent quality of a captured image. If the detector array is not sufficiently dense, this could result in aliased or under-sampled images. Much work has recently been done wherein a higher resolution and quality image is generated by considering multiple captured images of the same scene. This process is called super-resolution image generation. Super-resolution image generation is particular suited to images that are captured sequentially, e.g., by using a video camera, since there is high temporal and spatial correlation between successive frames.

Super-resolution image generation can have many different applications ranging from the generation of still images for printing purposes from a low resolution video, to the generation of High Definition Television (HDTV) from Standard Definition (SD) signals. Another application is in the area of security/surveillance systems and forensic sciences, especially after Sep. 11, 2001, where it is desirable to generate high resolution images from captured video sequences for the purpose of solving or even preventing crimes by, for example, identifying suspects. Other applications include aerial/satellite imaging, astronomy and even medical imaging. Although the generation of super-resolution images from still images often shown in movies and popular TV shows remains largely fiction, many of the recently proposed methods can produce rather impressive results.

Many of the previous techniques utilize Fourier domain methods where high frequency information is extracted from low frequency data in the low resolution images. Although such methods were relatively simple to implement, unfortunately they were also rather limited in terms of performance and applicability since they could not handle local and global motion. Instead, spatial domain techniques can produce considerably better results, although they are far more complicated since they require the consideration of motion registration and are in many cases iterative. Some of these methods have also been adapted to compressed video, thus making them more attractive in terms of applicability and usefulness.

In general, most of these methods use deterministic methods, such as Projections Onto Convex Sets (POCS) to enhance resolution in the spatial domain without taking into account any source statistics, while others are based on statistical formulations such as maximum likelihood or maximum a-posteriori probability (MAP) estimates.

An application very similar to super-resolution generation is video de-noising. Video de-noising is a feature of many modern video encoding architectures since it can considerably enhance coding efficiency while, at the same time, improve objective and subjective quality. Digital still or video images can include noise due to the capturing or analog to digital conversion process, or even due to transmission reasons. Noise, nevertheless, apart from the visual displeasing impact it may have, can also have a severe adverse effect in many applications and especially video compression. Due to its random nature, noise can considerably decrease spatial and temporal correlation, thus limiting the coding efficiency of such noisy video signals. Thus, it is desirable to remove noise without removing any of the important details of the image, such as edges or texture.

Several video de-noising architectures have been proposed in which de-noising is performed by either considering spatial or temporal filtering methods, or a combination thereof. Even the most advanced spatial methods, such as Wiener or wavelet filtering, tend to be more appropriate for still images, while, due to their nature, temporal and spatio-temporal methods are more appropriate for video signals due to the temporal correlation that exists between adjacent pictures. Such methods are well-known in the art and can generally be classified into motion and non-motion compensated filters, which may or may not consider motion estimation and compensation techniques for filtering the current picture.

In a first prior approach, a spatio-temporal video de-noising architecture was presented combined with a video encoder compliant with the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). In the first prior art approach, spatial filtering is performed on all pixels using a threshold based 3×3 pixel average, while the motion estimation process of the MPEG-4 AVC standard is reused for performing the temporal filtering. Considering that the MPEG-4 AVC standard allows the consideration and use of multiple references for predicting a block or macroblock, it is possible using this strategy to essentially generate several possible temporal predictions for the current pixel. These temporal predictions are then averaged together to form the final filtered picture. It should be noted that in this approach, motion estimation and compensation are performed on previously filtered pixels. Although this process could result in the generation of a more accurate motion field, this process could also result in some cases in the removal of some of the more refined details of a scene such as texture or edges.

An extension of this concept that has been proposed in a second prior art method involves performing more advanced motion compensation methods, through the consideration of wavelet filtering instead of the threshold based median. In the second prior art approach, a deblocking filter is introduced that is applied on the motion compensated residuals, therefore leading to fewer artifacts for the final de-noised video.

SUMMARY OF THE INVENTION

These and other drawbacks and disadvantages of the prior art are addressed by the present invention, which is directed to methods and apparatus for edge-based spatio-temporal filtering.

According to an aspect of the present principles, there is provided an apparatus for filtering a sequence of pictures. The apparatus includes a spatial filter, a motion compensator, a deblocking filter, and a temporal filter. The spatial filter is for spatially filtering a picture in the sequence and one or more reference pictures selected from among previous pictures and subsequent pictures in the sequence with respect to the picture. The motion compensator, in signal communication with the spatial filter, is for forming, subsequent to spatial filtering, multiple temporal predictions for the picture from the one or more reference pictures. The deblocking filter, in signal communication with the motion compensator, is for deblock filtering the multiple temporal predictions. The temporal filter, in signal communication with the deblocking filter, is for temporally filtering the multiple temporal predictions and combining the multiple temporal predictions to generate a noise reduced version of the picture.

According to another aspect of the present principles, there is provided an apparatus for forming super-resolution pictures from a sequence of pictures. The apparatus includes a spatial filter, a motion compensator, a spatial upsampler, a deblocking filter, and a temporal filter. The spatial filter is for spatially filtering a picture in the sequence and one or more reference pictures selected from among previous pictures and subsequent pictures in the sequence with respect to the picture. The motion compensator, in signal communication with the spatial filter, is for forming, subsequent to spatial filtering, multiple temporal predictions for the picture from the one or more reference pictures. The spatial upsampler, in signal communication with the motion compensator, is for performing spatial upsampling on the picture and the one or more reference pictures. The deblocking filter, in signal communication with the motion compensator, is for deblock filtering the multiple temporal predictions. The temporal filter, in signal communication with the deblocking filter, is for temporally filtering the multiple temporal predictions and combining the multiple temporal predictions to generate an upsampled version of the picture.

According to yet another aspect of the present principles, there is provided a method for filtering a sequence of pictures. The method includes spatially filtering a picture in the sequence and one or more reference pictures selected from among previous pictures and subsequent pictures in the sequence with respect to the picture. The method further includes forming, subsequent to spatial filtering, multiple temporal predictions for the picture from the one or more reference pictures. The method also includes deblock filtering the multiple temporal predictions. Moreover, the method includes temporally filtering the multiple temporal predictions and combining the multiple temporal predictions to generate a noise reduced version of the picture, subsequent to the deblock filtering.

According to a further aspect of the present principles, there is provided a method for forming super-resolution pictures from a sequence of pictures. The method includes spatially filtering a picture in the sequence and one or more reference pictures selected from among previous pictures and subsequent pictures in the sequence with respect to the picture. The method further includes forming, subsequent to spatial filtering, multiple temporal predictions for the picture from the one or more reference pictures. The method also includes performing spatial upsampling on the picture and the one or more reference pictures, and deblock filtering the multiple temporal predictions. Moreover, the method includes temporally filtering the multiple temporal predictions and combining the multiple temporal predictions to generate an upsampled version of the picture, subsequent to the deblock filtering.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
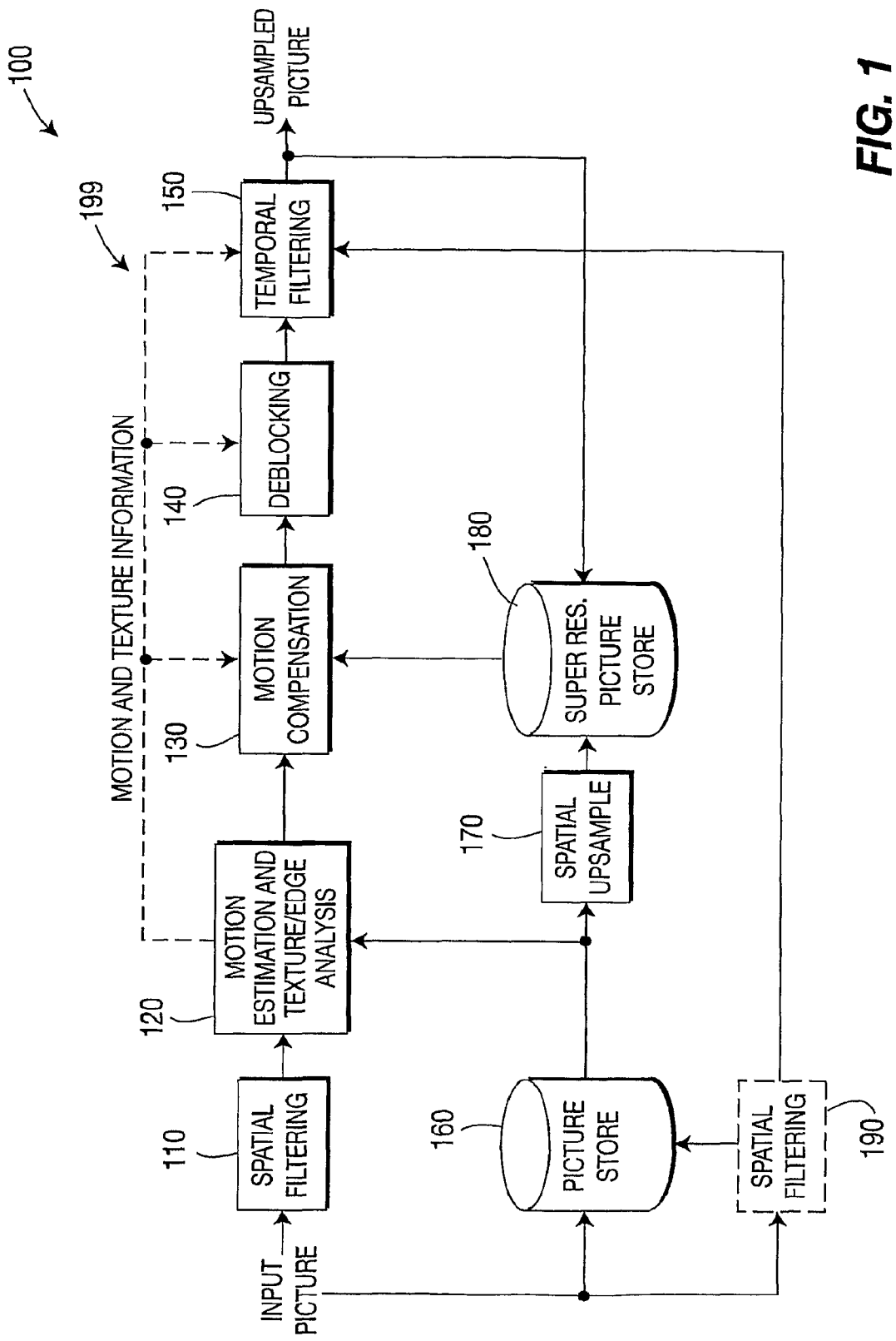
FIG. 1 shows a block diagram for an exemplary encoder, capable of super resolution image generation, to which the present principles may be applied, in accordance with an embodiment of the present principles.

The present invention is directed to methods and apparatus for edge-based spatio-temporal filtering.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Turning to FIG. 1, an exemplary encoder capable of super resolution image generation is indicated generally by the reference numeral 100. The encoder 100 includes a spatial filter 110 having an output connected in signal communication with a first input of a motion estimator and texture/edge analyzer 120. A first output of the motion estimator and texture/edge analyzer 120 is connected in signal communication with a second input of a motion compensator 130, a second input of a deblocking filter 140, and a second input of a temporal filter 150. A second output of the motion estimator and texture/edge analyzer 120 is connected in signal communication with a first input of a motion compensator 130. An output of the motion compensator 130 is connected in signal communication with a first input of a deblocking filter 140. An output of the deblocking filter 140 is connected in signal communication with a first input of a temporal filter 150. An output of the temporal filter 150 is connected in signal communication with a first input of a super resolution picture store 180. An output of the super resolution picture store 180 is connected in signal communication with a third input of the motion compensator 130. An output of a spatial upsampler 170 is connected in signal communication with a second input of the super resolution picture store.

An input of the encoder 100 is connected in signal communication with an input of the spatial filter 110, an input of a picture store 160, and an input of a spatial filter 190. An output of the picture store 160 is connected in signal communication with an input of the spatial upsampler 170 and a second input of the motion estimator and texture/edge analyzer 120. An output of the spatial filter 190 is connected in signal communication with a third input of the temporal filter 150. An output of the temporal filter 150 is available as an output of the encoder 100.

A Motion Compensated Temporal Filtering (MCTF) loop 199 may be considered to be formed from the motion estimator and texture/edge analyzer 120, motion compensator 130, deblocking filter 140, temporal filter 150, picture store 160, and optionally the spatial upsampler 170.

In accordance with the present principles, a video encoding method and apparatus are provided based on block based motion compensated filtering, combined with spatio-temporal analysis. It is to be appreciated that, given the teachings of the present principles provided herein, the approach described herein could be used apart from the generation of super-resolution images to also improve the performance of existing spatio-temporal de-noising schemes.

According to the above-referenced second prior art approach, de-noising was performed by performing motion estimation and compensation to generate several different temporally filtered predictions for the current image, which were then combined/averaged with a set of spatially filtered predictions. However, it is possible that in certain cases the motion vectors of the temporal filter estimated using any motion estimation algorithm are incorrect, or not accurate enough. For example, this could be the case during occlusion, fades or cross-fades, or non-translational motion (rotation, zoom, and so forth). Using the motion compensated signals for such cases could clearly result in severe artifacts. Although the motion estimation algorithm could be enhanced to consider some of these cases, this would lead to a far more complex system.

Instead, a simpler approach is to introduce a distortion threshold (e.g., MAD of current block tested) which tries to detect such cases and basically rejects the block prediction from a particular reference if its distortion exceeds its value. In an embodiment of the present principles, we consider this threshold to be equal to 5. Furthermore, in an embodiment, if the variance of the current block is very low (e.g., zero), then the current block is completely interpolated spatially if at all since this may imply that it is most likely unnecessary for this block to be temporally interpolated. Noise, for example, that could exist within a temporal reference could impair instead of helping the temporal prediction. In all such cases, we have replaced the prediction from a given reference with the spatial interpolated block prediction from the image of the original frame at time t, which could also be seen as a method of increasing the weighting for the spatial prediction compared to the temporal ones.

Although the thresholding method could reduce some artifacts of the motion compensated prediction, unfortunately it does not eliminate all of them. It is well known that motion compensated methods could result in severe blocking artifacts at block boundaries due to motion discontinuities. For this purpose, several video coding standards have introduced in-loop deblocking architectures that consider such discontinuities and try to alleviate them by using intelligent spatial filtering techniques at such boundaries. In some circumstances, a similar problem may also exist within our approach, even if the distortion from a prediction is small. For this purpose, a deblocking filter is introduced that may be applied after motion compensating each prediction. Such deblocking filter considers the pixel values at the boundary positions and motion, while considering the current quantization level, to determine whether these pixels need to be filtered to reduce blocking artifacts. In our case, we have considered the filter used in the MPEG-4 AVC standard for Inter slices and, in an embodiment of the present principles, have modified it to always apply on edges that do not belong to blocks replaced by the thresholding and variance processes described in the previous paragraph, regardless also of their motion. This results in considerably improved performance especially in terms of subjective quality for our motion compensated predictions.

If we also consider that edges are probably the most important feature that we would like to enhance when interpolating an image, an embodiment of the present principles involves an edge based criterion introduced herein to enhance coding performance particularly with respect to edges. Edges may be computed based on the well known Canny edge detector. Of course, the present principles are not limited to the use of solely the Canny edge detector and, thus, other edge detection algorithms may also be employed in accordance with the present principles while maintaining the scope of the present principles. If a pixel is found to be an edge then, in an embodiment, we may wish to modify the weighting for that pixel for a given reference and/or, in an embodiment, we may even introduce additional references, such as, for example, images generated through the use of edge preserving interpolation.

To summarize with respect to an illustrative example of one embodiment of the present principles, presume that we would like to upsample or denoise picture f(t) at time t and that we can use 2 past and 2 future frames for motion estimation and compensation purposes, namely pictures f(t−2), f(t−1), f(t+1), and f(t+2). Motion estimation using these four images is performed by splitting f(t) into non-overlapping blocks of size $B_1 \times B_2$ and by performing a search within a small window in each one of these reference pictures in order to locate the best possible match. These five images, including f(t) are then spatially upsampled using, for example, the 6 tap filter used by the MPEG-4 AVC standard, zero or first order hold, or even using more advanced interpolation methods such as wavelets, and the motion vectors from the low resolution images are used to generate the motion compensated frames which are then deblock filtered, resulting in super-resolution motion compensated predictions. The hypotheses generated through this process, for example, for a pixel (x,y) in this new image are $f'_{Sp}(x,y,t)$, $f'_T(x,y,t-2)$, $f'_T(x,y,t-1)$, $f'_T(x,y,t+1)$, and $f'_T(x,y,t+2)$. These five predictions are then combined together using weighted averaging resulting in the final denoised image as follows:

$$\hat{f}(x, y, t) = w_{Sp} f'_{Sp}(x, y, t) + \sum_{k}^{\{-2,-1,1,2\}} w_k f'_T(x, y, t+k) \quad (1)$$

Weights may be adaptive as discussed previously (e.g., based on distortion, edges, and so forth), and/or may even be fixed and depend on the temporal distance and reliability of each hypotheses. In an embodiment, the following equation for generating $\hat{f}(x,y,t)$ may be used if a pixel does not belong to an edge location:

$$\hat{f}(x, y, t) = \left\lfloor \frac{22 f'_{Sp1}(x, y, t) + \sum_{k}^{\{-2,-1,1,2\}} \frac{4 f'_T(x, y, t+k)}{k^2}}{32} \right\rfloor \quad (2)$$

If the pixel belongs to an edge then, in an embodiment, $\hat{f}(x,y,t)$ is computed as follows:

$$\hat{f}(x, y, t) = \left\lfloor \frac{49 f'_{Sp1}(x, y, t) + \sum_{k}^{\{-2,-1,1,2\}} \frac{6 f'_T(x, y, t+k)}{k^2}}{64} \right\rfloor \quad (3)$$

It is to be appreciated that the values specified herein are merely for illustrative purposes and, thus, other values could also be used, while maintaining the scope of the present principles.

Figure 2:
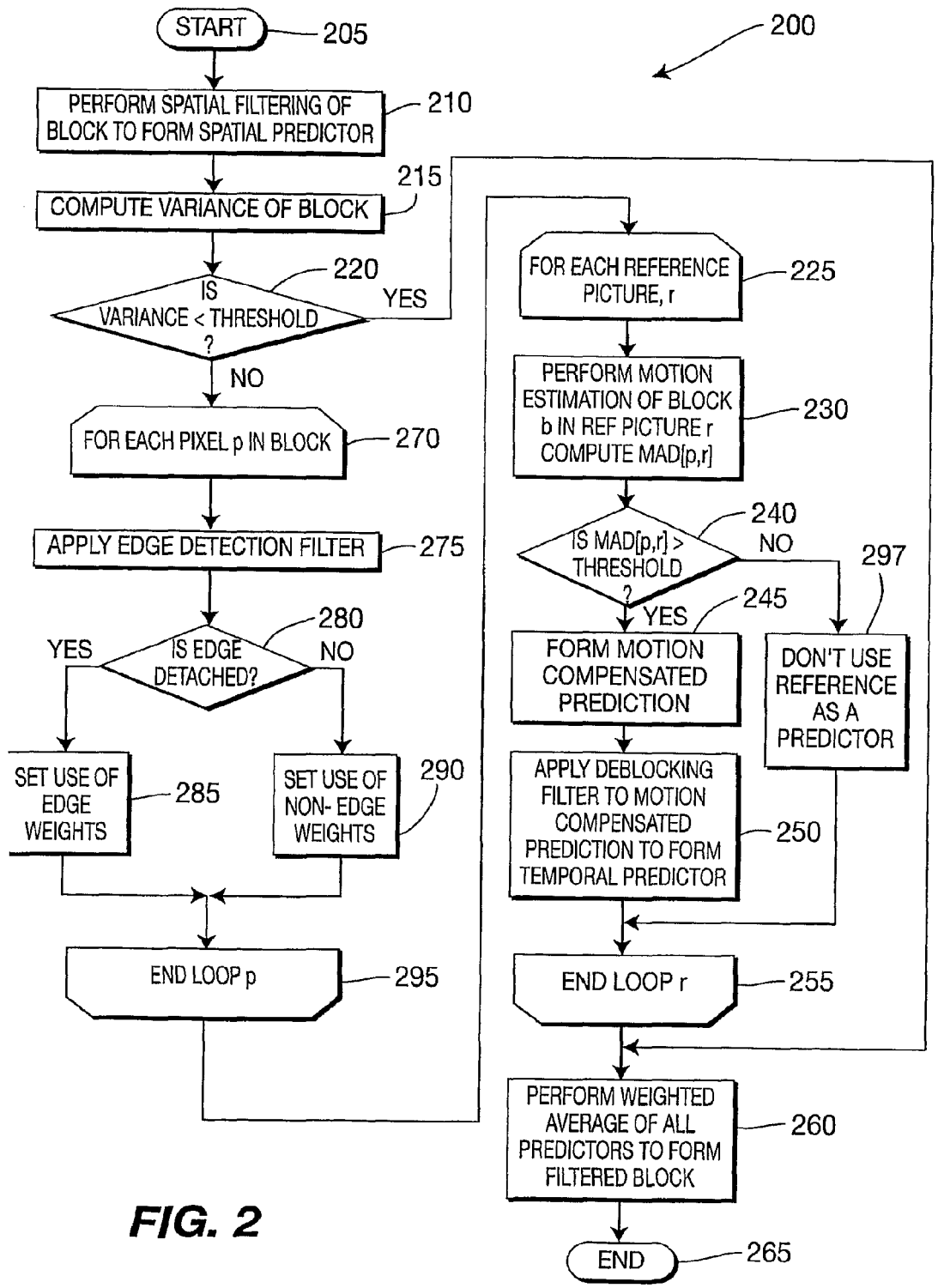
FIG. 2 shows a flow diagram for an exemplary video encoding method using edge-based noise filtering, in accordance with an embodiment of the present principles.

Turning to FIG. 2, an exemplary video encoding method using edge-based noise filtering is indicated generally by the reference numeral 200.

The method 200 includes a start block 205 that passes control to a function block 210. The function block 210 performs spatial filtering of a current block (hereinafter "block") to form a spatial predictor, and passes control to a function block 215. The function block 215 computes the variance of the block, and passes control to a decision block 220. The decision block 220 determines whether or not the variance is less than a threshold. If so, then control is passed to a function block 260. Otherwise, control is passed to a loop limit block 270.

The function block 260 performs weighted averaging of all predictors to form a filtered block, and passes control to an end block 265.

The loop limit block 270 performs a loop for each pixel, p, in the block, and passes control to a function block 275. The function block 275 applies an edge detection filter, and passes control to a decision block 280. The decision block 280 determines whether or not an edge has been detected. If so, the control is passed to a function block 285. Otherwise, control is passed to a function block 290.

The function block 285 sets the use of edge weights, and passes control to a loop limit block 295.

The function block 290 sets the use of non-edge weights, and passes control to the loop limit block 295.

The loop limit block 295 ends the loop, and passes control to a loop limit block 225. The loop limit block 225 performs a loop for each reference picture, r, and passes control to a function block 230. The function block 230 performs motion estimation of block b in reference picture r, computes MAD [p,r], and passes control to a decision block 240. The decision block 240 determines whether or not MAD[p,r] is less than a threshold. If so, the control is passed to a function block 245. Otherwise, control is passed to a function block 297.

The function block 245 forms a motion compensated prediction, and passes control to a function block 250. The function block 250 applies a deblocking filter to the motion compensated prediction to form a temporal prediction, and passes control to a loop limit block 255. The loop limit block 255 ends the loop, and passes control to the function block 260.

The function block 297 prohibits the use of the reference as a predictor, and passes control to the loop limit block 255.

A description will now be given of some of the many attendant advantages/features of the present invention, some of which have been mentioned above. For example, one advantage/feature is an apparatus for filtering a sequence of pictures. The apparatus includes a spatial filter, a motion compensator, a deblocking filter, and a temporal filter. The spatial filter is for spatially filtering a picture in the sequence and one or more reference pictures selected from among previous pictures and subsequent pictures in the sequence with respect to the picture. The motion compensator, in signal communication with the spatial filter, is for forming, subsequent to spatial filtering, multiple temporal predictions for the picture from the one or more reference pictures. The deblocking filter, in signal communication with the motion compensator, is for deblock filtering the multiple temporal predictions. The temporal filter, in signal communication with the deblocking filter, is for temporally filtering the multiple temporal predictions and combining the multiple temporal predictions to generate a noise reduced version of the picture.

Another advantage/feature is the apparatus as described above, wherein the multiple temporal predictions are based on correlation with the picture. The picture is an original input picture.

Yet another advantage/feature is the apparatus as described above, further comprising an analyzer, in signal communication with the spatial filter, the motion compensator, the deblocking filter, and the temporal filter, for analyzing at least one of textures and edges in the picture and the one or more reference pictures with respect to multiple analysis methods. The multiple temporal predictions are formed, deblock filtered, and temporally filtered, by the motion compensator, the deblocking filter, and the temporal filter, respectively, at least one of which based on at least one of the texture and edge information provided by the analyzer.

Moreover, another advantage/feature is the apparatus having the analyzer as described above, wherein the multiple analysis methods include at least one of edge detection, variance analysis, and texture detection.

Further, another advantage/feature is the apparatus having the analyzer as described above, wherein the deblocking filter is adapted based upon at least one of correlation with the picture and one or more of the multiple analysis methods, the picture being an original input picture.

Also, another advantage/feature is the apparatus having the analyzer as described above, wherein the deblocking filter is adapted based upon at least one of one or more of the multiple analysis methods and correlation with the picture, the picture being an original input picture.

Additionally, another advantage/feature is the apparatus having the analyzer as described above, wherein the multiple analysis methods are used to determine how the one or more temporal predictions are formed by the motion compensator.

Yet another advantage/feature is an apparatus for forming super-resolution pictures from a sequence of pictures. The apparatus includes a spatial filter, a motion compensator, a spatial upsampler, a deblocking filter, and a temporal filter. The spatial filter is for spatially filtering a picture in the sequence and one or more reference pictures selected from among previous pictures and subsequent pictures in the sequence with respect to the picture. The motion compensator, in signal communication with the spatial filter, is for forming, subsequent to spatial filtering, multiple temporal predictions for the picture from the one or more reference pictures. The spatial upsampler, in signal communication with the motion compensator, is for performing spatial upsampling on the picture and the one or more reference pictures. The deblocking filter, in signal communication with the motion compensator, is for deblock filtering the multiple temporal predictions. The temporal filter, in signal communication with the deblocking filter, is for temporally filtering the multiple temporal predictions and combining the multiple temporal predictions to generate an upsampled version of the picture.

Another advantage/feature is the apparatus as described above, wherein the multiple temporal predictions are based on correlation with the picture, the picture being an original input picture.

Yet another advantage/feature is the apparatus as described above, further comprising an analyzer, in signal communication with the spatial filter, the motion compensator, the deblocking filter, and the temporal filter, for analyzing at least one of textures and edges in the picture and the one or more reference pictures with respect to multiple analysis methods. The multiple temporal predictions are formed, deblock filtered, and temporally filtered, by the motion compensator, the deblocking filter, and the temporal filter, respectively, at least one of which based on at least one of the texture and edge information provided by the analyzer.

Moreover, another advantage/feature is the apparatus having the analyzer as described above, wherein the multiple analysis methods include at least one of edge detection, variance analysis, and texture detection.

Further, another advantage/feature is the apparatus having the analyzer as described above, wherein the deblocking filter is adapted based upon at least one of one or more of the multiple analysis methods and correlation with the picture, the picture being an original input picture.

Also, another advantage/feature is the apparatus having the analyzer as described above, wherein the multiple analysis methods are used to determine how the one or more temporal predictions formed by the motion compensator.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for filtering a sequence of pictures, comprising:
 a spatial filter for spatially filtering a picture in the sequence and at least one reference picture selected from among previous pictures and subsequent pictures in the sequence with respect to the picture;
- a motion compensator, in signal communication with said spatial filter, for forming, subsequent to spatial filtering, multiple temporal predictions for the picture from the at least one reference picture;
- a deblocking filter, in signal communication with said motion compensator, for deblock filtering the multiple temporal predictions; and
- a temporal filter, in signal communication with said deblocking filter, for temporally filtering the multiple temporal predictions and combining the multiple temporal predictions to generate a noise reduced version of the picture.

2. The apparatus of claim 1, wherein the multiple temporal predictions are based on correlation with the picture, the picture being an original input picture.

3. The apparatus of claim 1, further comprising an analyzer, in signal communication with said spatial filter, said motion compensator, said deblocking filter, and said temporal filter, for analyzing at least one of textures and edges in the picture and the at least one reference picture with respect to multiple analysis methods,
wherein the multiple temporal predictions are formed, deblock filtered, and temporally filtered, by said motion compensator, said deblocking filter, and said temporal filter, respectively, at least one of which based on at least one of the texture and edge information provided by said analyzer.

4. The apparatus of claim 3, wherein the multiple analysis methods comprise at least one of edge detection, variance analysis, and texture detection.

5. The apparatus of claim 3, wherein said deblocking filter is adapted based upon at least one of correlation with the picture and one or more of the multiple analysis methods, the picture being an original input picture.

6. The apparatus of claim 3, wherein said deblocking filter is adapted based upon at least one of one or more of the multiple analysis methods and correlation with the picture, the picture being an original input picture.

7. The apparatus of claim 3, wherein the multiple analysis methods are used to determine how the one or more temporal predictions are formed by said motion compensator.

8. An apparatus for forming super-resolution pictures from a sequence of pictures, comprising:
- a spatial filter for spatially filtering a picture in the sequence and at least one reference picture selected from among previous pictures and subsequent pictures in the sequence with respect to the picture;
- a motion compensator, in signal communication with said spatial filter, for forming, subsequent to spatial filtering, multiple temporal predictions for the picture from the at least one reference picture;
- a spatial upsampler, in signal communication with said motion compensator, for performing spatial upsampling on the picture and the at least one reference picture;
- a deblocking filter, in signal communication with said motion compensator, for deblock filtering the multiple temporal predictions; and
- a temporal filter, in signal communication with said deblocking filter, for temporally filtering the multiple temporal predictions and combining the multiple temporal predictions to generate an upsampled version of the picture.

9. The apparatus of claim 8, wherein the multiple temporal predictions are based on correlation with the picture, the picture being an original input picture.

10. The apparatus of claim 8, further comprising an analyzer, in signal communication with said spatial filter, said motion compensator, said deblocking filter, and said temporal filter, for analyzing at least one of textures and edges in the picture and the at least one reference picture with respect to multiple analysis methods,
wherein the multiple temporal predictions are formed, deblock filtered, and temporally filtered, by said motion compensator, said deblocking filter, and said temporal filter, respectively, at least one of which based on at least one of the texture and edge information provided by said analyzer.

11. The apparatus of claim 10, wherein the multiple analysis methods comprise at least one of edge detection, variance analysis, and texture detection.

12. The apparatus of claim 10, wherein said deblocking filter is adapted based upon at least one of one or more of the multiple analysis methods and correlation with the picture, the picture being an original input picture.

13. The apparatus of claim 10, wherein the multiple analysis methods are used to determine how the one or more temporal predictions formed by said motion compensator.

14. A method for filtering a sequence of pictures, comprising:
- spatially filtering a picture in the sequence and at least one reference picture selected from among previous pictures and subsequent pictures in the sequence with respect to the picture;
- forming, subsequent to spatial filtering, multiple temporal predictions for the picture from the at least one reference picture;
- deblock filtering the multiple temporal predictions; and
- temporally filtering the multiple temporal predictions and combining the multiple temporal predictions to generate a noise reduced version of the picture, subsequent to said deblock filtering.

15. The method of claim 14, wherein the multiple temporal predictions are based on correlation with the picture, the picture being an original input picture.

16. The method of claim 14, further comprising analyzing at least one of textures and edges in the picture and the at least one reference picture with respect to multiple analysis methods,
wherein the multiple temporal predictions are formed, deblock filtered, and temporally filtered, at least one of which based on at least one of the texture and edge information provided by said analyzing step.

17. The method of claim 16, wherein the multiple analysis methods comprise at least one of edge detection, variance analysis, and texture detection.

18. The method of claim 16, wherein said deblock filtering step is adapted based upon at least one of correlation with the picture and one or more of the multiple analysis methods, the picture being an original input picture.

19. The method of claim 16, wherein said deblock filtering step is adapted based upon at least one of one or more of the multiple analysis methods and correlation with the picture, the picture being an original input picture.

20. The method of claim 16, wherein the multiple analysis methods are used to determine how the one or more temporal predictions are formed by said forming step.

21. A method for forming super-resolution pictures from a sequence of pictures, comprising:
- spatially filtering a picture in the sequence and at least one reference picture selected from among previous pictures and subsequent pictures in the sequence with respect to the picture;

forming subsequent to spatial filtering, multiple temporal predictions for the picture from the at least one reference picture;

performing spatial upsampling on the picture and the at least one reference picture;

deblock filtering the multiple temporal predictions; and temporally filtering the multiple temporal predictions and combining the multiple temporal predictions to generate an upsampled version of the picture, subsequent to said deblock filtering.

22. The method of claim 21, wherein the multiple temporal predictions are based on correlation with the picture, the picture being an original input picture.

23. The method of claim 21, further comprising analyzing at least one of textures and edges in the picture and the at least one reference picture with respect to multiple analysis methods (120), wherein the multiple temporal predictions are formed, deblock filtered, and temporally filtered, at least one of which based on at least one of the texture and edge information provided by said analyzing step.

24. The method of claim 23, wherein the multiple analysis methods comprise at least one of edge detection, variance analysis, and texture detection.

25. The method of claim 23, wherein said deblock filtering step is adapted based upon at least one of one or more of the multiple analysis methods and correlation with the picture, the picture being an original input picture.

26. The method of claim 23, wherein the multiple analysis methods are used to determine how the one or more temporal predictions formed by said forming step.

* * * * *